(12) United States Patent
Strussion

(10) Patent No.: US 12,225,898 B2
(45) Date of Patent: Feb. 18, 2025

(54) INTERACTIVE DEER SCENT DISPLAY APPARATUS AND RELATED METHOD

(71) Applicant: Brooke Balsei, Blacklick, OH (US)

(72) Inventor: Christopher J. Strussion

( * ) Notice: Subject to any disclaimer, the term of this patent is extended or adjusted under 35 U.S.C. 154(b) by 0 days.

(21) Appl. No.: 17/721,278

(22) Filed: Apr. 14, 2022

(65) Prior Publication Data
US 2024/0180145 A1 Jun. 6, 2024

Related U.S. Application Data

(63) Continuation-in-part of application No. 16/439,080, filed on Jun. 12, 2019, now abandoned.

(51) Int. Cl.
*A01M 31/00* (2006.01)

(52) U.S. Cl.
CPC ................. *A01M 31/008* (2013.01)

(58) Field of Classification Search
CPC .. A01M 31/00; A01M 31/008; A01M 31/025; A01M 31/04; A01M 31/06
See application file for complete search history.

(56) References Cited

U.S. PATENT DOCUMENTS

| | | | | |
|---|---|---|---|---|
| 6,901,693 | B1* | 6/2005 | Crowe | A01M 31/06 43/2 |
| 8,938,905 | B1* | 1/2015 | Moore | A01M 31/06 43/2 |
| 2013/0340315 | A1* | 12/2013 | Gustafson | A01M 31/06 |
| 2016/0120168 | A1* | 5/2016 | Blaha | A01M 31/00 |
| 2018/0192632 | A1* | 7/2018 | Healy | A01M 31/00 |

* cited by examiner

*Primary Examiner* — Joshua J Michener
*Assistant Examiner* — Henry Hooper Mudd
(74) *Attorney, Agent, or Firm* — Gary P. Topolosky

(57) ABSTRACT

An interactive scent display device with a plurality of communicative scent surfaces disposed in an anatomically correct dispersion for attracting deer. A hunter or game observer can easily and quickly emplace place it the device in a desired tree or ground location. The interactive scent display device provides a visual attractant to deer and displays the natural or synthetic gland scents deer use in communication within the herd.

19 Claims, 5 Drawing Sheets

INTERACTIVE DEER SCENT DISPLAY APPARATUS AND RELATED METHOD

CROSS-REFERENCE TO RELATED APPLICATIONS

This application is a continuation-in-part of application Ser. No. 16/439,080, filed on Jun. 12, 2019, the disclosure of which is fully incorporated herein.

BRIEF DESCRIPTION OF THE INVENTION

Field of the Invention

This invention relates to deer hunting assists. More particularly, it relates to devices and apparatus for assisting the hunter in drawing deer to his/her hunting location. It employs applying various interactive scents to a tree or to a ground-mounted scent display apparatus as further described herein.

SUMMARY OF THE DRAWINGS

Further features, objectives and advantages of the present invention, currently being marketed under the brand name BuckStik™, will be clearer in the following detailed description made with reference to the accompanying drawings in which.

DETAILED DESCRIPTION OF PREFERRED EMBODIMENTS

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provide an interactive deer scent display apparatus A. That apparatus not only provides a visual attractant to deer, but also serves as a scent dispersal in the correct anatomical positioning to the respective communicative scent glands of deer. It allows a person to attract deer to a desired spot they choose by scent dispersion according to deer social behaviors.

Figure 1:
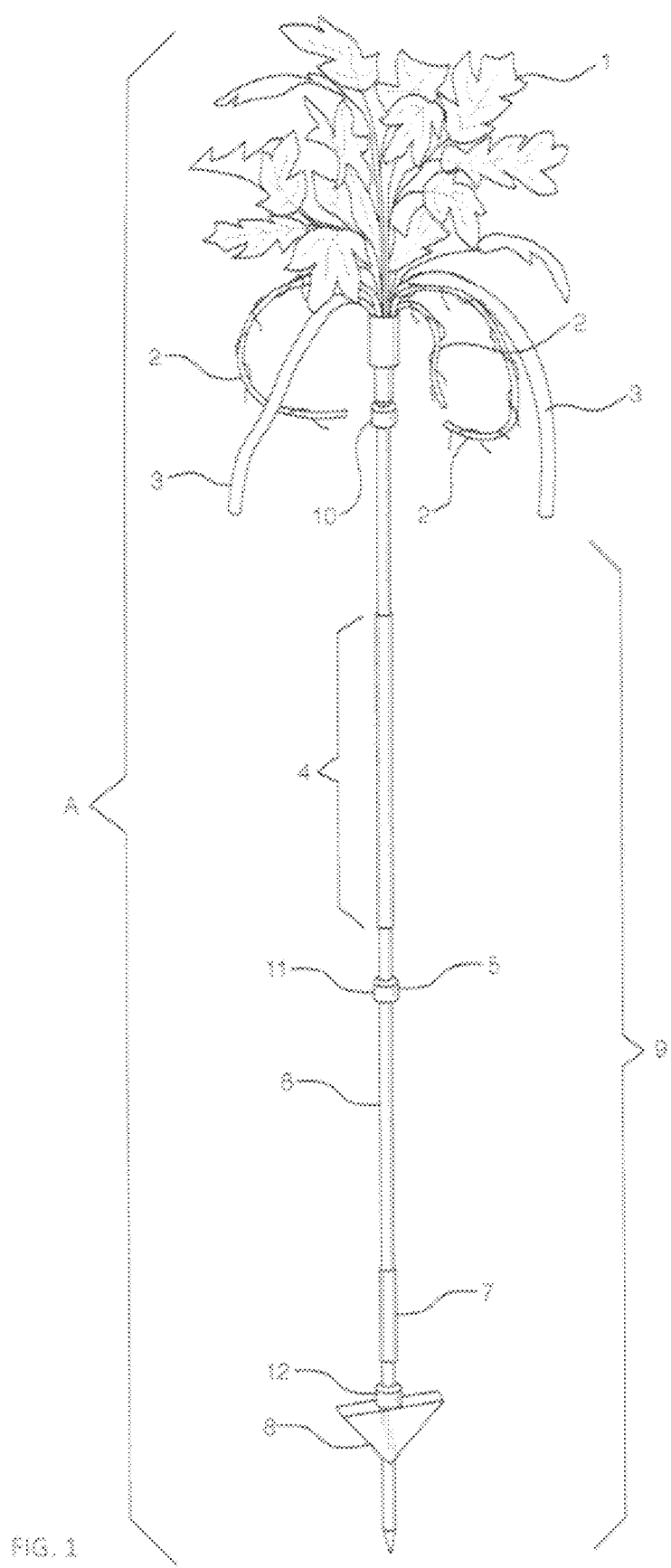
FIG. 1 is a front plan view of one embodiment of ground-mounted apparatus according to this invention.
Figure 3:
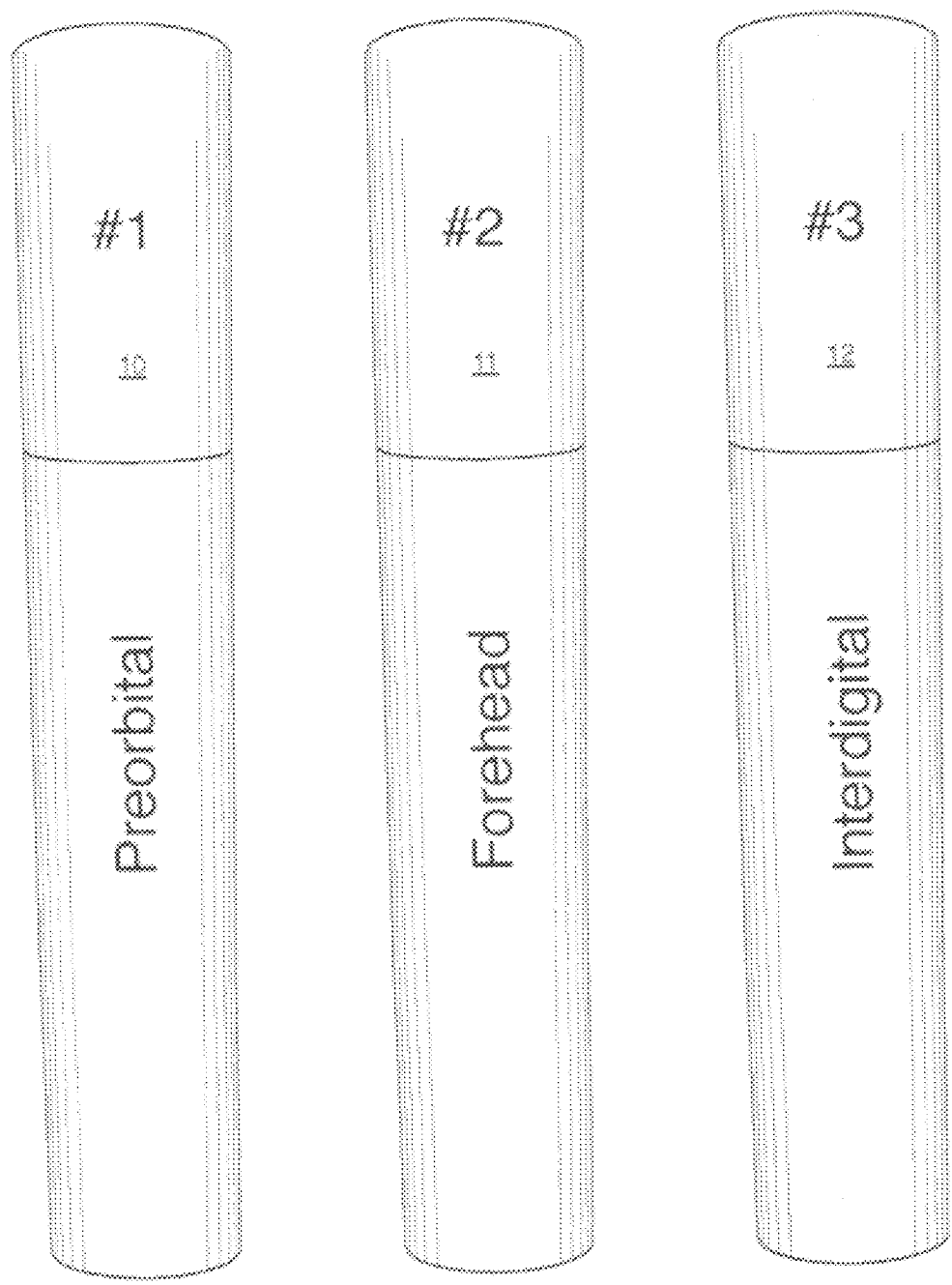
FIG. 3 is a front plan view showing the three separate scent containers for use with the aforementioned apparatus.

As seen in reference to FIG. 1, a non-limiting embodiment of ground-mounted apparatus A includes: an interactive leaf display 1, an interactive rope display 2; a pre-orbital scent gland pad (or vine) 3; an interactive, roughened strip display 4; a forehead scent gland pad 5; a first connecting ferrule 6; an inter-digital gland scent pad 7; a ground penetrating stake and stabilizer 8; and a flexible elongate rod 9. The scent gland pads 3, 5, and 7, and inter active displays 1, 2, and 4, are adapted to carry one of a plurality of natural or synthetic deer attractant scents, more particularly: a quantity of collected whitetail pre-orbital gland scent 10; a quantity of collected whitetail forehead gland scent 11; and a quantity of whitetail inter-digital gland scent 12. Containers with these same three, site-specific scents are shown in the respective bottles, 10 through 12, in FIG. 3.

The interactive leaf display 1 includes a plurality of silk synthetic leaves carried on a plurality of wire-reinforced, rough durable plastic stems and branches. The interactive rope display 2 may be formed by a plurality of cut lengths of organic coconut fiber ropes. The ends of the interactive leaf display and the interactive rope display are gathered and enclosed in a retainer that is coupled to a top end of flexible elongate rod 9.

The plurality of scent gland pads 3, 5, and 7, may be formed of a suitable absorbent material to carry plurality of scents. By way of non-limiting example, the scent pads 3, 5, 7 may be formed of a resilient porous foam material, felt, or other fabric. In some embodiments, the plurality of scent gland pads 2, 5, and 7, may also include a synthetic material impregnated with a desired scent. The pre-orbital scent pad 3 is disposed subjacent to the connector for the interactive leaf display 1 and rope display 2.

The interactive roughened strip display 4 may be formed by rough nylon woven strips secured around an upper section of the elongate rod 9, below the pre-orbital scent pad 3. As will be appreciated the rough center strip display 4 may also be integrally formed with the upper section of the elongate rod 9.

A forehead scent gland pad 5 is disposed along the elongate rod 9 at an intermediate section of the elongate rod, preferably below the interactive roughened strip display 4. For a collapsible elongate rod 9, a ferrule 6 may be included to join one or more segments of the elongate rod 9. In other embodiments, the elongate rod 9 may also have one or more foldable joints, or may also be formed in a telescoping configuration. Preferably the elongate rod 9 is formed of a lightweight flexible fiberglass tubular material.

The inter-digital scent pad 7, is disposed at a bottom end of the elongate rod 9, above a ground penetrating stake 8 end of the elongate rod 9. The ground-penetrating stake 8 may also include at least one flange extending from the side to provide a foot placement for urging the rod into the ground and stabilizing the display in a ground surface.

In the non-limiting embodiment shown, the (two-piece) elongate rod 9 is the main body of the display to which all the interactive parts are attached. The rod 9 may be a ⅜" fiberglass rod that is flexible and allows the resistance and interaction deer look for in small saplings and trees. Attached at the top of the fiberglass rod 9 is the interactive top assembly 1, 2 and 3. The leaf assembly 1 is a visual attractant to deer and the fabric materials also collects and holds a deer's pre-orbital gland used for communication. The interactive ropes 2 are configured to collect and hold a deer's saliva and further the deer's communication with the herd. The pre-orbital scent pad 3 holds a quantity of the pre-orbital gland lure 10 and is positioned at anatomically correct eye level with the deer.

Between the center and top of the flexible rod 9 is an interactive, rough and woven, strip 4. This interactive roughened strip 4 provides the display with the correct "feel" for a deer to rub and interact with. When formed of a woven or porous material it allows the interactive strip 4 to collect and retain the interacting deer's forehead gland scent.

In the middle of the elongate rod 9 is a forehead scent pad 5 for holding a quantity of pure forehead gland scent attractant 11. Note how this scent pad is presented at the anatomically correct position natural to deer.

At the center of the fiberglass rod 9 is a ferrule 6 for connecting the two pieces of the rod. The ferrule 6 allows the rod 9 to be broken down into two pieces for easy breakdown and transport. Near the bottom of the fiberglass rod 9 is located the inter-digital scent pad 7, which is used for holding the pure inter-digital gland attractant 12. Being located proximal to ground level the inter-digital scent pad 7 is anatomically positioned with that of a deer's hooves. The steel bladed step-in (8) makes it simple and easy to insert fiberglass rod (9) into the ground while also adding some much needed stability.

By placing this invention in the ground, the hunter can choose any location near deer habitat, providing a suitable line of sight from a desired observation point. Applying the attractant scents to be disposed at the correct anatomical level, a hunter can attract deer to any location he chooses.

Figure 2:
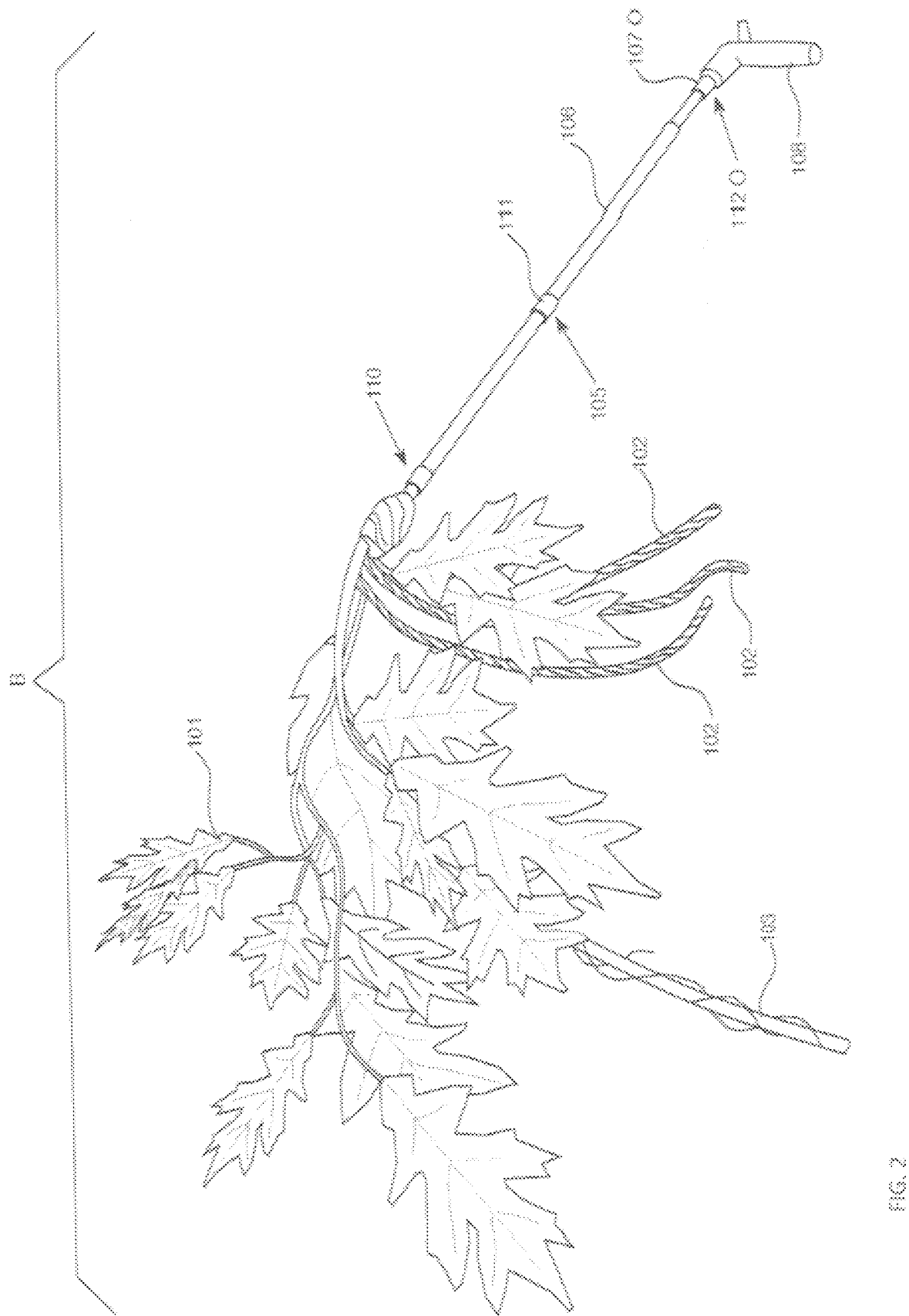
FIG. 2 is front plan view of one embodiment of tree-mounted apparatus according to this invention.

In the second variation of apparatus B, FIG. 2 shows a tree-mounted alternative. For this alternate embodiment, common elements with those in FIG. 1 are commonly numbered though in the next hundred series. As such, this version of tree-mounted apparatus B comprises: an interactive leaf display 101, an interactive rope display 102; a pre-orbital scent gland pad (or vine) 103 for holding a quantity of pre-orbital scent 110; an interactive, roughened strip display 104; a forehead scent gland pad 105 for holding a quantity of forehead scent 111; a first connecting ferrule 106 and a tree-mounted stabilizer bracket 108. Optionally, a base scent gland pad 1070 may be positioned at or near the stabilizer bracket 108 (especially when positioned nearer the ground rather than higher up a given tree trunk) for optionally holding a quantity of whitetail inter-digital gland scent 1120.

Instructions for Use

It is suggested that assembly of either apparatus (ground OR tree mount) be done in the field. First, assemble the two halves at the metal ferrule. Then, using one's foot, push the post into the ground with its easy step-in, until the base of the rod is flush with the ground. Next, arrange the top leaf assembly by spreading out its leaves. Finally, apply each of the glands as follows: the pre-orbital gland to the top leaf assembly and interactive ropes; the forehead gland to the middle, interactive forehead strip and the inter-digital glad to the bottom scent pad and surrounding ground.

It is not recommended to use this apparatus with any other product. Nor should the apparatus be placed near bait or mineral sites. Note that it takes very little pure gland to "prime" or activate the apparatus. In fact, too much gland could result in a negative reaction by deer on first approach. Try using one or two sprays only and refresh about every 2 to 3 weeks.

This invention uses a buck's own natural pheromones in a bio communication system/lure/attractant. Unlike urine-based lures, this invention taps into the very psyche of a buck's communication with his herd. By presenting three main glands for communicating through rubs and scrapes, this apparatus helps the buck establish territorial herd dominance.

It is best to use the aforementioned apparatus from August to September and into the stages of rut. Though bucks, does and fawns have been known to interact and communicate with the apparatus year round. During the off season (May-early August), the invention works well by itself just by situating the apparatus anywhere deer congregate including feeding areas, fields, tunnel crossings, etc. Using the device with a trail cam during the off season enables one to inventory the herd and keep tabs on up-and-coming bucks.

Pre-rut, active rut or post-rut, this invention works best as it is the most territorial time of the year. Testosterone spikes and this apparatus assists in telling those nearby that "a new guy's in town". Ideally, one should situate his or her BuckStik™ near their stand about 48 hours before hunting . . . preferably about 20-25 yards away.

It should be understood, of course, that the foregoing relates to exemplary embodiments of the invention and that modifications may be made without departing from the spirit and scope of the invention as set forth herein.

Figure 4:
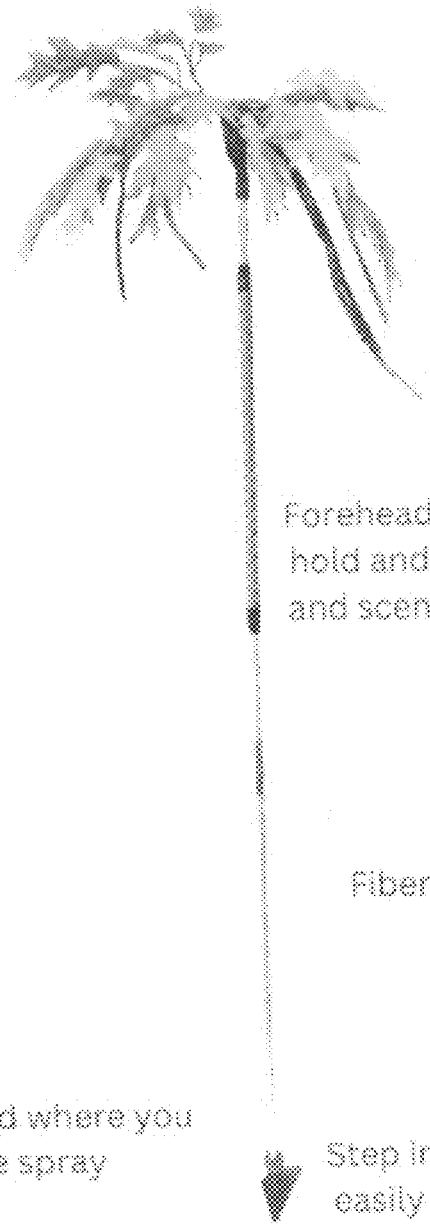
FIG. 4A is a front plan view showing one embodiment of the invention with its preorbital, forehead and interdigital sections broken out and the preferred sprays applied to each.

Referring to FIGS. 4A and B, there is shown one preferred embodiment broken into its three main component sections (FIG. 4A), namely the Preorbital, Forehead and Interdigital parts. In FIG. 4B, there is a closeup breakdown of the various components in one preferred embodiment.

This system (device/apparatus and method) uses a buck's own natural pheromones. Unlike urine based lures, the BuckStik taps into the very basic psyche of a buck's communication with the herd. By presenting the three (3) main glands used for communication (through rubs and scrapes) and establishing territorial herd dominance, it's in a buck's very nature to have to interact with the BuckStik.

BuckStik uses the three main glands used to communicate through rubs and scrapes. Best results with the BuckStik are typically seen from August into the late stages of the rut.

During the early stages of the rut, we suggest utilizing the BuckStik as instructed+with a mock scraped and #4 Beads (sold separately). This tells dominant bucks in the area they have some serious competition in their territory.

Deer mainly bucks, establish a pecking order within the herd. BuckStik is designed to collect and uses their own scent and DNA to maintain communication all year long.

Off Season Application:

The off season is all about maintaining communication and herd inventory. We have found bucks, does and even fawns interact and communicate with the BuckStik all year long. Rain, snow, or sunshine deer continuously interact with the BuckStik.

During the off season (March-July). BuckStik works great by itself. Place the BuckStik anywhere deer congregate such as feeding areas, fields, funnel crossings etc. During Off-season do not use #2 or #3 Spray on the BuckStik. Only use #1 Preorbital spray on the BuckStik's leaves and vine. Spray once every 3-4 weeks during the off season.

Territorial:

The most active, and exciting way to use BuckStik . . . . And our favorite time of year . . . the RUT!

Pre-rut, active rut, post rut . . . it doesn't matter. This is when bucks are the most territorial! (when testosterone spikes). When you put out a BuckStik this time of year, you are telling bucks in the area "THERE IS A NEW BUCK IN TOWN!" This is when it gets intense and exciting!

One of the best ways to use the BuckStik during any stage of the rut is to place it near your stand about 48-72 hours before you hunt it. Find a good spot about 20-25 yards from your stand and place it there. Once it's in the ground, make a mock scrape right in front of the BuckStik. This is when we suggest using BuckStik #4 Pure tarsal Gland (Sold Separately) on/near the mock scrape. BuckStik #4 introduces a highly concentrated 4th gland (90% tarsal/10% High testosterone urine).

At this point, it's up to you if you want to put a trail cam on it. Now you've just made it perfectly clear to the dominant bucks there's a new guy in town! Their senses are at an all-time high and the testosterone is pumping . . . . Aggressive grunts and rattling will produce high results as the dominant bucks are now looking for the "new guy".

BuckStik Instructions:

We suggest all assembly be done in the field.
1. Assemble the two halves at the metal ferrule.
2. With your foot, push post into the ground using the easy step-in, until flush with the ground.
3. Arrange top leaf assembly, by spreading the leaves out.
4. Bend vine arched and facing downward.
5. Apply each gland by using the gland diagram below:
   a. Pre-Orbital #1 Gland applies to top leaf assemble and interactive vine. 2 Sprays total.
   b. Forehead #2 Gland applies directly to the middle interactive forehead strip. 1 spray
   c. Interdigital Gland #3 applies to the bottom scent pad and surrounding ground. 1-2 sprays.
6. Refresh every 3-5 weeks.
   We do not recommend using any other product with the BuckStik. (No Urine or Scent Elimination Products)
   Placing the BuckStik near bait or mineral sites is not recommended.
   It takes very little of our pure gland sprays to prime or activate the BuckStik.
   Too much gland can result in a negative reaction at first approach.
   If you over sprayed it, leave it out and don't refresh for at least 2 months.

Rain does not affect the BuckStik and does not need refreshing after.

Figure 5:
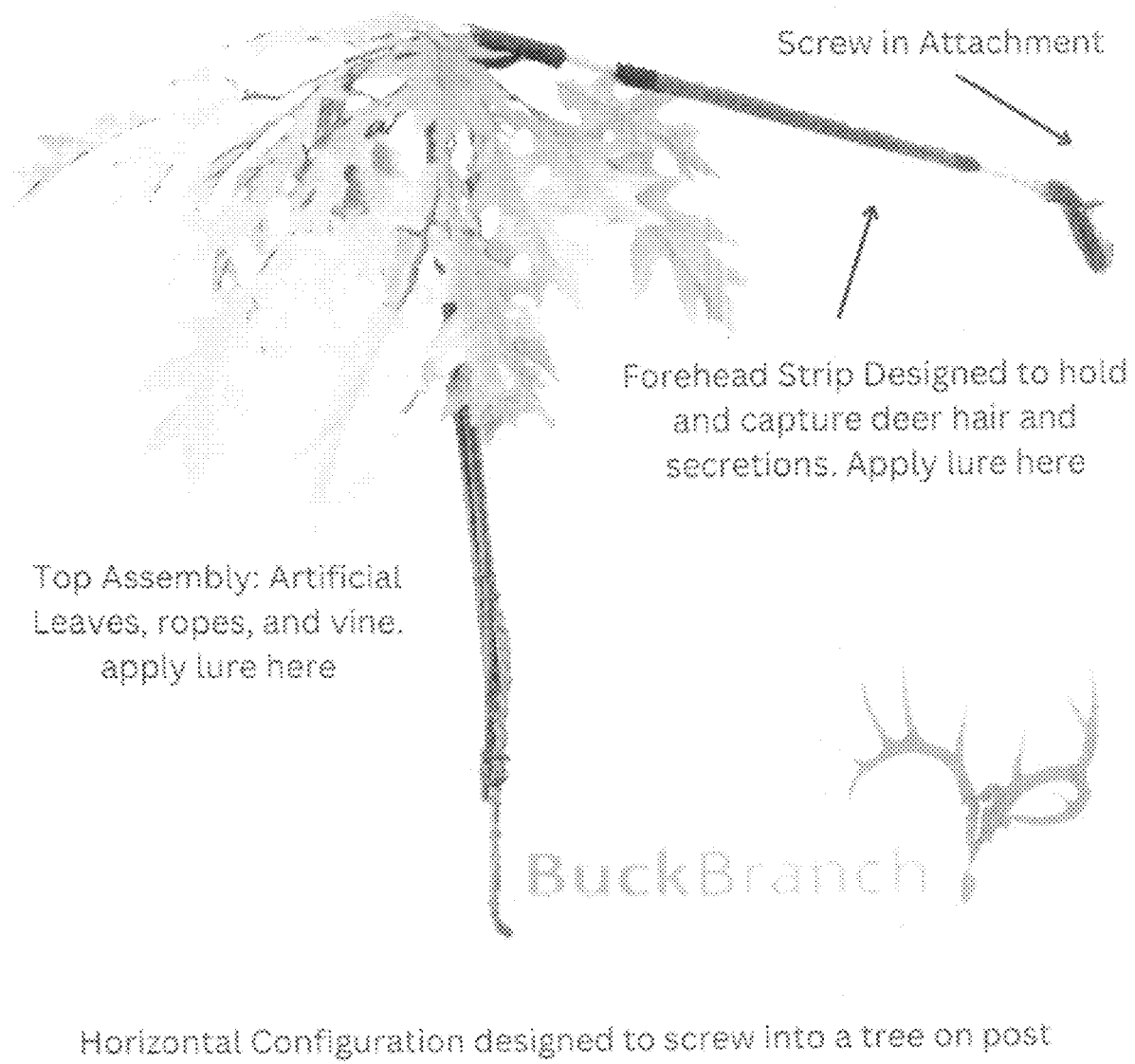
FIG. 5 is a side perspective view of the BuckBranch (mounted diagonally to a tree branch).

The BuckBranch, tree mounted version depicted in FIG. 5, Scraping, like rubbing, allows a buck to make his presence known by dispensing gland scent throughout his area. Typical scraping behavior involves leaving scent from a buck's preorbital and forehead glands.

All deer use scrapes to communicate with one another throughout the year but they become more visible during the rut because deer have more urgent information to relate. Scrapes are often (mistakenly) thought of in terms of territorial markers made by only a single buck and/or only during the rut.

The Buckbranch (FIG. 5) is a beacon that provides everything that bucks (and does) are looking for to communicate with the herd. True communal scrapes cannot be made with curiosity scent and/or urine . . . . It takes glands for true communication.

This one preferred embodiment of tree branch mounted variant includes: a four foot long, ⅜" fiberglass rod construction; an interactive vine braided with coconut fiber rope for the perfect scent wick; an interactive forehead strip; an interactive coconut fiber rope section; and set of three separate gland scents (the kit includes 5 ml of each). These scents are preorbital, forehead and interdigital—packaged in easy to spray bottles. Caution—these scents should be used sparingly, according to directions, to avoid spooking the deer. These are NOT urines but rather very powerful communication tools and should be used properly.

It includes an easy-to-use screw in mount, installs in seconds and creates an instant interaction device.

Having described the presently preferred embodiments, it is to be understood that the invention may be otherwise embodied within the scope of the appended claims.

What is claimed is:

1. A deer scent display apparatus with three separate glad lure pad sections, said display apparatus comprising: (a) a leaf display component; (b) at least one of a rope display component and a vine display component; (c) an elongated stake suitable for mounting at a lower end of the elongated stake to a tree or into a ground location; (d) a pad on the elongated stake onto which to administer a pre-orbital scent gland lure; (e) a pad on the elongated stake onto which to administer a forehead scent gland lure; and (f) a pad on an above ground portion of the elongated stake onto which to administer an interdigital gland lure.

2. The deer scent display apparatus of claim 1 wherein the interdigital gland lure pad is located at or near the lower end of the elongated stake.

3. The deer scent display apparatus of claim 1 wherein at least one of the pre-orbital scent gland lure, the forehead scent gland lure and the inter-digital gland lure are synthetic.

4. The deer scent display apparatus of claim 1, which further includes a roughened strip display against which deer may rub its head and leave its own DNA.

5. The deer scent display apparatus of claim 4 wherein the roughened strip display is located at or near a central point of the elongated stake.

6. The deer scent display apparatus of claim 4 wherein the roughened strip display is integrally formed with the elongated stake.

7. The deer scent display apparatus of claim 1 wherein the elongated stake is made in multiple sections that are joined together for assembly and use.

8. The deer scent display apparatus of claim 1 wherein the elongated stake is made in telescopic sections.

9. The deer scent display apparatus of claim 1 wherein the elongated stake is made from a flexible fiberglass material.

10. The deer scent display apparatus of claim 1, which further includes one or more flanges at the lower end of the elongated stake for assisting with installation into the ground location.

11. The deer scent display apparatus of claim 1, which further includes one or more flanges at the lower end of the elongated stake for rapidly mounting, at an angle, to a tree branch or trunk.

12. An interactive deer scent apparatus for displaying and collecting three separate gland lure deer scents in correct anatomical positions, said apparatus comprising: (a) a leaf display component; (b) at least one of a rope display component and a vine display component; (c) an elongated stake suitable for mounting at a lower end of the elongated stake angularly to a tree or substantially vertically into a ground location; (d) a roughened strip display against which deer may rub its head; (e) a pad onto which to administer a pre-orbital scent gland lure; (f) a pad onto which to administer a forehead scent gland lure; and (g) a pad on an above ground portion of the elongated stake onto which to administer an inter-digital gland lure.

13. The interactive deer scent display apparatus of claim 12 wherein the elongated stake is made in multiple sections that are joined together for assembly and use.

14. The interactive deer scent display apparatus of claim 12 wherein the elongated stake is made from a flexible fiberglass material.

15. The interactive deer scent display apparatus of claim 12, which further includes one or more flanges at the lower end of the elongated stake for assisting with installation into the ground location.

16. The interactive deer scent display apparatus of claim 12, which further includes one or more flanges at the lower end of the elongated stake for rapidly mounting, at an angle, to a tree branch or trunk.

17. A method for attracting deer to a given external location comprises;
  (a) providing an interactive deer scent apparatus comprising:
    (i) a leaf display component;
    (ii) at least one of a rope display component and a vine display component;
    (iii) an elongated stake suitable for mounting at a lower end of the elongated stake into ground at the external location;
    (iv) a roughened strip display against which deer may rub its head;
    (v) a pad onto which to administer a pre-orbital scent gland lure;
    (vi) a pad onto which to administer a forehead scent gland lure; and
    (vii) a pad on an above ground portion of the elongated stake onto which to administer an inter-digital gland lure;
  (b) installing the elongated stake of the apparatus into ground at the external location; and
  (c) administering the pre-orbital scent gland lure, the forehead scent gland lure and inter-digital gland lure to their respective pads on the apparatus.

18. The method of claim 17 wherein the pre-orbital scent gland lure, the forehead scent gland lure and inter-digital gland lure are synthetic.

19. The method of claim 17, which further includes:
  (d) periodically applying additional gland lure to one or more of the pads on the apparatus.

* * * * *